United States Patent [19]

Melahn

[11] Patent Number: 4,655,418
[45] Date of Patent: Apr. 7, 1987

[54] EMERGENCY SUPPLY CONTAINER

[76] Inventor: Raymond A. Melahn, 625 W. Woodcrest, Fullerton, Calif. 92632

[21] Appl. No.: 283,023

[22] Filed: Jul. 13, 1981

[51] Int. Cl.$^4$ .............................................. B64D 1/14
[52] U.S. Cl. ................................. 244/138 R; 222/105; 222/183; 206/523; 206/803
[58] Field of Search ........................ 222/105, 131, 183; 206/803, 523, 583, 521; 244/138 R

[56] References Cited

U.S. PATENT DOCUMENTS

| | | | |
|---|---|---|---|
| 2,430,905 | 11/1947 | Bradley | 244/138 R |
| 3,032,302 | 5/1962 | Clark | 244/138 R |
| 3,040,879 | 6/1962 | Planitzer | 206/523 |
| 3,117,606 | 1/1964 | Hastings | 244/138 R X |
| 3,391,885 | 7/1968 | Genco | 244/138 R |
| 3,505,503 | 7/1970 | McGehee | 244/138 R |
| 3,756,469 | 9/1973 | Clark et al. | 222/183 X |
| 4,165,024 | 8/1979 | Oswalt et al. | 222/181 X |

Primary Examiner—Charles A. Marmor
Attorney, Agent, or Firm—G. Donald Weber, Jr.

[57] ABSTRACT

There is shown and described a unique apparatus and method of safely supplying material of a loose (e.g. liquid) nature in remote or hostile environments on a cost effective basis in emergency conditions for example by air drop.

14 Claims, 5 Drawing Figures

U.S. Patent   Apr. 7, 1987   4,655,418
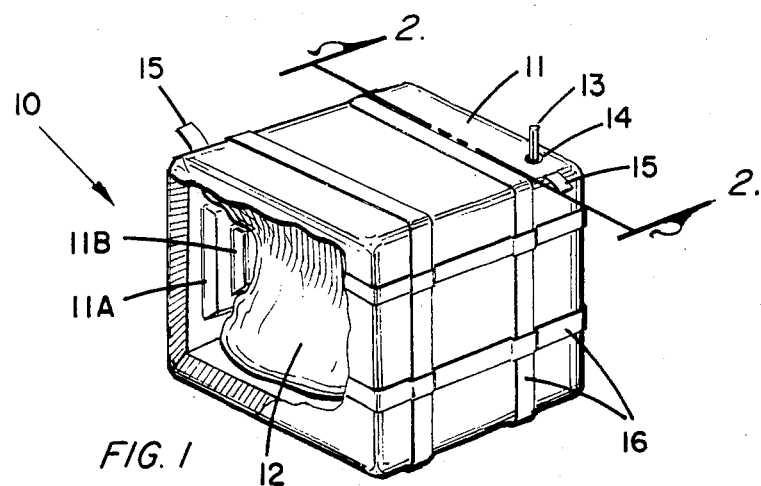
FIG. 1
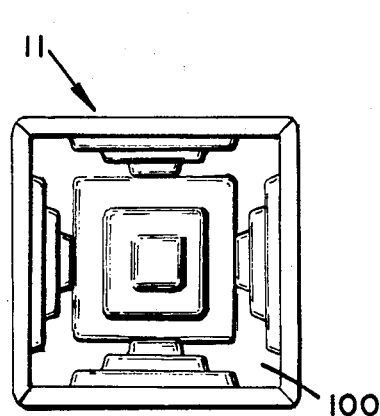
FIG. 3
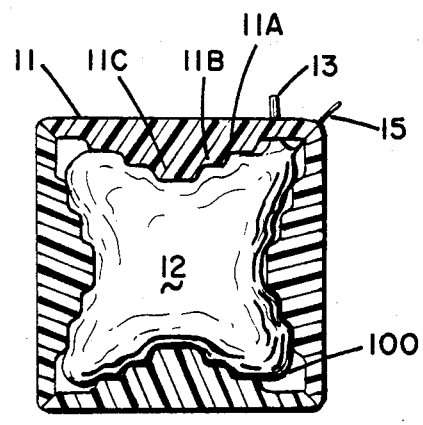
FIG. 2
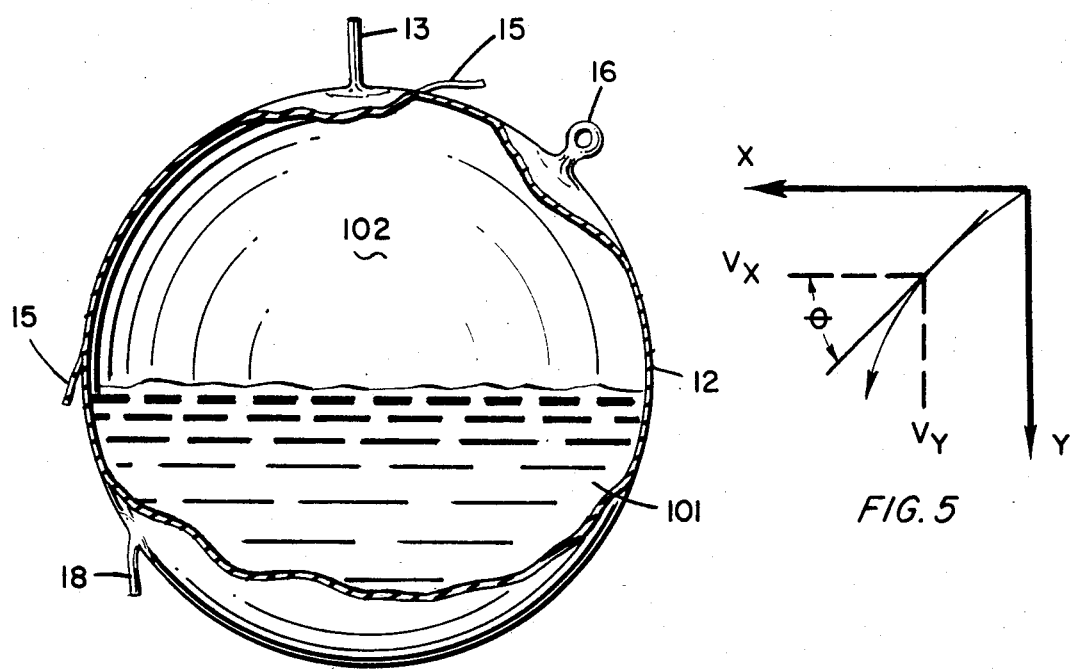
FIG. 4
FIG. 5

EMERGENCY SUPPLY CONTAINER

BACKGROUND

1. Field of the Invention

This invention is directed generally to a material supply apparatus and method and, more particularly, to an air lift delivery method associated with a unique container to be air dropped, in particular.

2. Prior Art

It has become readily apparent that it is highly desirable to be able to move and efficiently deliver certain kinds of materials rapidly in various times of emergency. For example, in the event that people are trapped or disabled in a remote area or a relatively hostile environment, it may become necessary or desirable to supply them with certain materials as rapidly as possible. Likewise, in times of warfare or the like, it is considered likely that the battlefields will be in remote locations or hostile environments. Moreover, the battlefields may no longer be linear (or planar).

Many of these remote locations or hostile environments can be in areas such as deserts or large expanses of otherwise uninhabited and, perhaps, uninhabitable terrain. Because of the remote location or the inaccessability thereof, it is considered highly desirable, and highly likely, that the delivery of such materials would be by air lift, and, more particularly, by air drop. That is, an air lift would be used because of large distances or critical time factors for supplying the materials. For example, it might be essential to provide water to stranded personnel in either peace time or war time activities. Likewise, it might be easier or more economical to supply fuel to such stranded personnel as well. Of course, in times of war or other hostilities, it may be essential to provide fuel to permit the stranded personnel to evacuate the position in which they find themselves While in an emergency costs are sometimes considered secondary, it is also desirable to provide a method and apparatus whereby the materials can be supplied on a reasonably cost effective basis. This would be enhanced by using containers which are designed for high survivability and, at least to some degree, recoverable. Also, the space taken up by the containers, as well as the amount and cost of material of which the containers are fabricated should be minimized to increase the cost effect of the delivery system.

In the past, air drops have been provided using parachutes connected to containers, skids or the like. However, parachutes are extremely expensive and of only marginal recoverability in these situations. Moreover, the size of parachutes for the apparatus currently in use can be quite large and cumbersome. In addition to being expensive, the size of parachutes is often unrelated to load utility. Moreover, the packages will also utilize valuable space in the cargo aircraft which is making the delivery. In addition, the type of container and the type of parachute are frequently incompatible. That is, a large container of liquid such as water or fuel would be quite heavy and require an enormous parachute. Moreover, the parachute would still permit the container to land at a relatively rapid rate wherein the container would probably be ruptured and the contents thereof lost.

Further, the container/parachute method of delivery is often ineffective from the load survivability point of view. It can be readily seen that the requirement for proper placement of an air dropped load, even though the parachute is extremely large, further requires that the parachute not be so large that the drop location is missed due to a higher level or extent of floating action. This then becomes a cause of lower survivability of the load and container due to the increased probability of container rupture and loss of the contents thereof. Moreover, because of floating action, placement is difficult and causes losses as well.

The prior art approaches to this situation have been directed to the areas of using parachute airdrops, or extremely strong, rigid containers to protect the contents thereof, or very elaborate (and consequently expensive) containers which are adapted to absorb some of the energy produced upon impact. However, none of the known systems of this type have been found to be cost effective or to be truly effective. Consequently, a further study in this area has been made.

PRIOR ART

The most pertinent prior art known to applicant was found in a search of class 222/105, 93 and class 244/138 and is listed herewith.

U.S. Pat. No. 3,339,673—Shafer—directed to an expandable, energy absorbing material to be used as an outer protective cylindrical casing.

U.S. Pat. No. 3,383,017—Krings—directed to an aerial drop container which has a double-wall construction of high tensile strength material.

U.S. Pat. No. 3,696,969—DeVan et al.,—directed to an enclosure wherein the inner liner is disposable and the outer casing is re-usable.

U.S. Pat. No. 3,815,772—Elmore, et al., directed to a shipping container of plywood and an inner liner which is easily punctured. The plywood container is intended to be recoverable.

U.S. Pat. No. 3,937,363—Anderson—directed to a heavy-duty, re-usable outer container and a thin, easily punctured inner liner.

SUMMARY OF THE INVENTION

This invention is directed to a unique apparatus for containing materials therein, especially liquids, in which the container is adapted to be air dropped to remote locations. The container includes an inner bag which contains the materials and an outer container which protects the inner bag and eases handling and the air dropping thereof. The bag is intended to be recoverable while the outer container is, generally, expendable.

BRIEF DESCRIPTION OF THE DRAWINGS

FIG. 1 is a perspective view, partially broken away, of a container of the instant invention.

FIG. 2 is a cross-sectional view taken along the lines 2—2 of the container shown in FIG. 1.

FIG. 3 is an end view of the container with one side thereof removed.

FIG. 4 is a partially broken away view of the inner bag portion of the container showing the liquid contents thereof.

FIG. 5 is a graphic representation for illustrating the trajectory of a container of the instant invention.

DESCRIPTION OF A PREFERRED EMBODIMENT

Referring now to FIG. 1, there is shown a perspective view of the container of the instant invention. For convenience, a portion of one end wall has been broken away to better show the inner portions thereof. In particular, the container 10 comprises an outer shell 11 and an inner bag 12. The outer shell 11 is comprised of, typically, six separate walls. In a preferred embodiment, the walls are all identical wherein the container 11 takes the form of a cube. However, it should be clear that a cubic construction is not absolutely essential to the invention but does assist in ease of fabrication, reduction of inventory count and the like. In addition, it is believed that the cubical configuration will also assist in the air drop characteristics as described hereinafter.

The container 10, as noted, comprises a plurality of sides which are generally smooth on the outer surface thereof and arranged to have a stepped, pyramidal, configuration on the inner surface thereof. That is, the center or mid-portion of each side wall is thicker than the edge portion thereof in this embodiment in order to provide an increase in resistance to burst. The step portions 11A and 11B are seen as extending inwardly toward the center of the container. The inner portion of the container, i.e., bag 12, is arranged to be stored within the confines of the container 11. It will be seen that the bag is stored upon assembly of container 11 in an empty or deflated condition so that it can better fill the interior space provided within container 11.

When the bag is inserted into the container, a fill neck 13 attached to the bag 12 extends through a hole 14 which can be molded in the side of the container or can be drilled or punched during manufacture or assembly. Neck 13 communicates with bag 12 by means of a check valve which permits the bag to easily be filled but not to be easily emptied through the fill neck. In addition, flaps 15 extend from the outer surface of bag 12 and are engaged by the edges of the sides of container 11 to maintain bag 12 in a preferred and specified position. This position is arranged so that the bag 12 is adapted to receive the material to be stored therein in the most favorable fashion. Typically, flaps 15 are spaced apart by about the width of the container 11 so that the neck 13 is held adjacent the hole in the container wall.

The container is then held together by a suitable adhesive, for example. Straps 16, such as those indicated in FIG. 1, are added to increase burst resistance and strength. The number and positioning of the straps 16 is a function of the size of container 11 and the respective strengths and types of materials utilized.

Referring now to FIG. 2, there is shown a cross-sectional view of the apparatus shown in FIG. 1. In this view, the step or pyramidal construction of the various sidewalls is readily depicted. The steps or levels 11A, 11B and 11C are clearly defined. However, the number of steps is less important than the function of providing strength. It is obvious that each of the side members has the same general configuration. This arrangement permits the sides to be interchangeable and replaceable one by the other. The bag 12 is stored within the open space 100 in the container 11. The bag is compressed and adapted to fill the space 100 in the optimum manner. The fill stem 13 and the positioning flat 15 are shown as well.

Referring now to FIG. 3, there is shown an end view of container 11 with one end removed therefrom. This view shows the stepped (or pyramidal) configurations of the respective sides and the interaction with other sides or end portions.

Referring now to FIG. 4, there is shown a suitable design for a bag 12 with a portion thereof broken away. The bag includes the fill stem 13, positioning straps 15, and drain stem 18. Also attached to the bag is a suitable loop 16 which can be used for hanging or holding the bag when in use. Drain stem 18 is, preferably, opposite hanging loop 16 to facilitate draining bag 12. Of course, a suitable check valve is used with drain steam 18. The bag 12 is shown as having a total internal capacity or volume indicated by the reference numeral 102. The internal portion of the bag is partially filled by material 101 such as water, fuel or the like.

In formulating the method and apparatus of this invention, the basic details are noted above. However, certain important considerations and parameters must be noted. For example, in the fabrication of the apparatus, the various side walls of outer container 11 are fabricated of polystyrene or some other relatively light but sturdy material. By using material such as polystyrene, easy fabrication techniques are provided. In addition, as noted, the material is light and does not create a significant weight factor during the delivery operation. Also, polystyrene or similar foamed plastic material will be unlikely to cause a puncture or tear in the bag 12 stored therein and/or when delivered. Also, the inner edges of the respective sides and steps 11A, 11B and so forth should be rounded in order to prevent any puncturing or pinching of the bag during assembly or upon impact.

When the box has been substantially constructed, the bag 12 is inserted therein while empty. The bag is disposed within the container to utilize as much of the container space 100 as possible. The filler stem 13 is arranged to protrude through hole 14 in the side of the container 11. The flaps 15 are arranged to be held in position by the edges of the sides of container 11 when assembled, thereby holding the portion of the bag up to the top side allowing more efficient fill. Flaps 15 are, preferably, tear away flaps. Subsequent to box and bag assembly, the straps 16 are placed about the container. It should be noted that straps 16 are not intended to hold the container together but, rather, to enhance burst strength.

The material is then inserted into bag 12 via stem 13. It is significant to recognize that the volume of the material which is inserted into the bag 12 will be less than the entire volume available and, probably, on the order of one-half of the actual volume. However, this becomes an advantage as discussed hereinafter.

Bag 12 is typically made of a highly tear and puncture resistant material which is flexible and easily handled. A typical material which would be usable is made by the DuPont Corporation and is sold under the trademark KEVLAR. This material is of the type used in fabricating a bullet-proof vest and has high puncture resistance as well as high tear resistance. These characteristics aid in the high survivability of the bag 12 as described above.

Once the bag has been placed in the container, the bag is filled with the material to be dropped, it is loaded onto an airplane and transported to the location for the airdrop. Of course, the bag can be filled after the container is loaded onto the airplane. It has been determined that, with the materials and construction utilized and defined above, the optimum trajectory upon drop would have the container strike the ground at an angle between 30 and 60 degrees relative to the earth (see FIG. 5). That is, a 90 degree impact trajectory (i.e., dropped straight down), would probably have a high impact destruction rate for the container and the contents. A trajectory of less than 30 degrees would probably have a similar high destruction rate due to tearing and abrasion of the bag (rather than the inability to absorb energy upon impact as would occur in the 90 degree drop) because the energy absorption factors to be gained due to the impact burst of the outer box would not be used to maximum advantage.

By maintaining the 30 to 60 degree impact trajectory, it is seen that the container 11 will tend to explode or disintegrate upon impact. However, the material and the design of the container are such that the disintegration thereof will be such as to substantially absorb impact shock and energy as the apparatus strikes the ground. As most of the energy is absorbed by the disintegrating container, the inner bag 12 is substantially protected from initial shock. Immediately subsequent, however, some shock will be transmitted to the bag and its contents as the outer container 11 disintegrates and the bag explodes out of the box and expands to its full size which is much larger that the box. For this reason, the bag has been filled only to approximately half of its actual volume wherein the bag will expand upon the disintegration of the outer container 11. While the bag is expanding, the contents thereof is also able to expand and safely dissipate the energies and forces produced during the impact. Note that the bag itself would probably burst if filled to capacity. Moreover, the partially filled bag would tend to hop and flop clumsily along the ground rather than skidding or bouncing as it would if it were full. This action will tend to dissipate secondary impact energies as well, wherein the bag will tend to have greater survivability.

While it is not essential, certain characteristics and parameters are noted. For example, as noted above, the sides of container 11 can be fabricated of polystyrene or the like. The thickest portion of the side will be at the center while the thinner portions thereof will be at the edges which abut, edge to edge, the adjacent side panel. For example, the wall thickness of a side panel at the edges would be approximately two inches while the wall thickness at the center would be on the order of four inches in the case of a five gallon internal load utilizing a bag of approximately eleven gallons capacity. The internal volume of the box is that space required to hold a collapsed bag containing the volume of material, the collapsed bag volume, and probably some small unused volume. A fair estimate of gallonage in this instance is ten to eleven gallons. The internal box volume would be on the order of 12 to 13 gallons in the embodiment shown and described.

In a similar nature, the bag is formed of KEVLAR material or the like and has a wall thickness of approximately one-quarter to one-half inch. The internal volume of the bag is on the order of 11 gallons but the material inserted therein would be on the order of 5 gallons.

When the box is assembled, all of the edges or the like are joined together with a compatible glue of suitable nature. In addition, it would be important that the strap 16 be of a material, such as teflon or the like, which is designed to break upon impact and not to remain intact, and thereby, provide a cutting edge or the like. In point of fact, it might be desirable to perforate the tapes so as to ensure the breaking thereof upon impact. In addition, the fill valve 13 and the drain valve 18 can be arranged to be recessed.

Referring now to FIG. 5, there is shown a graphical representation of an air drop trajectory. The X-Y coordinates are depicted along with the representation of the X and Y components of the velocity vector. This graph is useful analyzing the impact parameters as noted and recorded herewith:

Given: Object at height Y and horizontal velocity Vo.

Find: Height Y, impact velocity and time of fall for various angles of impact.

Assume: Free fall with no drag.

Solution:

$$\frac{W}{g} \frac{dVx}{dt} = 0; \quad \frac{W}{g} \frac{dVy}{dt} = W \quad Y = \frac{gt^2}{2}$$

$$Vx = Vo \qquad Vy = gt$$

$$\frac{Vy}{Vx} = \tan\theta \quad Vy = Vx \tan\theta = Vo \tan\theta = gt$$

$$t = \frac{Vo \tan\theta}{g} \quad Y = \frac{g}{2}\left[\frac{Vo \tan\theta}{g}\right]^2 = \frac{Vo^2 \tan^2\theta}{2g}$$

If $g = 32.2$ Ft/Sec$^2$ and $Vo = $ Mph, then:

Height =

$$Y (\text{ft}) = Vo^2 (\text{mph}) \tan^2\theta \left[\frac{88 \times 88}{60 \times 60 \times 2 \times 32.2}\right] \qquad (1)$$

$$\text{Impact Velocity} = V_I = \sqrt{Vx^2 + Vy^2} = \qquad (2)$$

$$\sqrt{Vo^2 \left(\frac{g\, Vo}{g} \tan\theta\right)^2} = Vo\sqrt{1 + \tan^2\theta}$$

$$t (\text{sec}) = Vo (\text{mph}) \tan\theta \left[\frac{88}{60 \times 32 \times 2}\right] \qquad (3)$$

TABLE 1

| | Impact Velocity (MPH) | | |
| --- | --- | --- | --- |
| | | MPH | |
| DEG | 130 | 140 | 150 |
| 30 | 150 | 162 | 173 |
| 35 | 159 | 171 | 183 |
| 40 | 170 | 183 | 196 |
| 45 | 184 | 198 | 212 |
| 50 | 202 | 218 | 233 |
| 55 | 227 | 244 | 262 |
| 60 | 260 | 280 | 300 |

TABLE 2

| | Release Height (Ft.) | | |
| --- | --- | --- | --- |
| | | MPH | |
| DEG | 130 | 140 | 150 |
| 30 | 188 | 218 | 251 |
| 35 | 277 | 321 | 368 |
| 40 | 398 | 461 | 529 |
| 45 | 565 | 655 | 752 |
| 50 | 802 | 930 | 1067 |
| 55 | 1151 | 1335 | 1533 |
| 60 | 1693 | 1964 | 2255 |

TABLE 3

| DEG | Fall Time (Sec.) MPH | | |
|---|---|---|---|
| | 130 | 140 | 150 |
| 30 | 3 | 4 | 4 |
| 35 | 4 | 4 | 5 |
| 40 | 5 | 5 | 6 |
| 45 | 6 | 6 | 7 |
| 50 | 7 | 8 | 8 |
| 55 | 8 | 9 | 10 |
| 60 | 10 | 11 | 12 |

The mathematics are used to derive equations (1), (2), and (3) from which the data in Tables 1, 2 and 3 are obtained. These data are illustrative of certain operations of the invention as described.

Thus, there has been shown and described a new and unique apparatus which is readily adaptable and usable in the air dropping of emergency materials to personnel in need of the materials. The materials can be water, fuel or other similar material. The apparatus is adapted to be delivered by aircraft without the requirement of parachutes or other restraining devices although the use thereof may provide an assist in landing an apparatus of this type. The apparatus is adapted to be recoverable in part (bag) and expendable in part (box). More importantly though, the materials and container portions are fabricated of relatively inexpensive material and are, therefore, able to provide a very cost effective delivery mechanism for use in emergency situations. Studies have shown that this method and apparatus are approximately twice as cost effective as the known prior art approach. Moreover, while certain parameters and materials have been shown and described, these specifications are illustrative only and are not intended to be limitative. Rather, the scope of this invention is limited only by the claims appended hereto.

Having thus described a preferred embodiment, what is claimed is:

1. A substantially cubic container for use in air dropping of materials comprising,
   an outer casing formed of a relatively light weight rigid material, and
   an inner bag of flexible, relatively high tear and puncture resistant material to be stored within said outer casing,
   said outer casing comprising a plurality of substantially identical side and end members,
   said outer casing formed of a material which is adapted to disintegrate upon impact in order to absorb the impact energy and to protect the inner bag.

2. The container recited in claim 1 wherein,
   each of said side and end memebers is thicker at the center thereof than at the edges thereof.

3. The container recited in claim 1, wherein,
   said outer casing is formed of polystyrene type material.

4. The container recited in claim 1 wherein,
   said inner bag is made of KEVLAR material.

5. The container recited in claim 1 wherein,
   said inner bag is adapted to be about one-half full of material and packed into said outer casing in a manner to permit said inner bag to expand upon impact to absorb impact energy without bursting.

6. The container recited in claim 1 wherein,
   said inner bag includes inlet and outlet means whereby said bag may be selectively filled and emptied.

7. The container recited in claim 6 wherein,
   said inner bag includes tab means for positioning said inner bag within said outer casing.

8. The container recited in claim 1 wherein,
   said outer casing is designed to burst on impact and said bag is designed to expand upon impact to disperse impact forces without rupturing said bag.

9. The container recited in claim 1 wherein,
   each of said side and end members is substantially pyramidal in configuration.

10. The container recited in claim 6 including,
    an aperture in one of said side and end members through which the inlet means is accessible.

11. The container recited in claim 6 wherein,
    said inlet means comprises a filling neck and appropriate valves therein to permit filling of the bag to the extent desired.

12. The container recited in claim 6 wherein,
    said bag includes means for hanging said bag which is disposed opposite to said outlet means.

13. The container recited in claim 1 wherein,
    each of said side and end members is substantially identical and is devoid of any sharp edges at the inner surface thereof.

14. The container recited in claim 1 including,
    at least one strap means placed about said container to selectively retain said container in an assembled condition.

* * * * *